United States Patent
Tsuruta (10) Patent No.: US 9,745,776 B2
(45) Date of Patent: Aug. 29, 2017

(54) KEY CYLINDER DEVICE

(71) Applicant: KABUSHIKI KAISHA TOKAI RIKA DENKI SEISAKUSHO, Aichi (JP)

(72) Inventor: Hiroshi Tsuruta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/983,002

(22) Filed: Dec. 29, 2015

(65) Prior Publication Data

US 2016/0194900 A1    Jul. 7, 2016

(30) Foreign Application Priority Data

Jan. 7, 2015    (JP) .................................. 2015-001414

(51) Int. Cl.
*E05B 29/00* (2006.01)
*E05B 35/00* (2006.01)
(Continued)

(52) U.S. Cl.
CPC .......... *E05B 29/0013* (2013.01); *B60R 25/02* (2013.01); *E05B 19/0023* (2013.01);
(Continued)

(58) Field of Classification Search
CPC ............ Y10T 70/5956; Y10T 70/5889; Y10T 70/7593; Y10T 70/7655; Y10T 70/7915;
(Continued)

(56) References Cited

U.S. PATENT DOCUMENTS 3,748,877 A * 7/1973 Wolter .............. B60R 25/02121
                                                         70/186
3,782,145 A * 1/1974 Wolter .............. B60R 25/02128
                                                         70/186
(Continued)

FOREIGN PATENT DOCUMENTS

JP    7150829 A      6/1995
JP    3346706 B2    11/2002
(Continued)

OTHER PUBLICATIONS

Japanese Office Action corresponding to application No. 2015-001414 dated Apr. 5, 2016 and English translation.
(Continued)

*Primary Examiner* — Suzanne Barrett
(74) *Attorney, Agent, or Firm* — Roberts Mlotkowski Safran Cole & Calderon P.C.

(57) ABSTRACT

A key cylinder device includes a rotor resiliently mounting tumblers that are aligned by insertion of a mechanical key, a rotor case rotatably housing the rotor that is inserted in a direction opposite to an insertion direction of the mechanical key, and a cylindrical sleeve arranged around an outer peripheral surface of the rotor and fixed to an inner surface of the rotor case. The sleeve includes a hole that allows the tumblers to be disengaged when the mechanical key is inserted and to be engaged when the mechanical key is extracted.

7 Claims, 8 Drawing Sheets

(51) Int. Cl.
  *E05B 19/00* (2006.01)
  *B60R 25/02* (2013.01)
  *B60R 25/021* (2013.01)
  *E05B 77/44* (2014.01)

(52) U.S. Cl.
  CPC ........ *E05B 19/0029* (2013.01); *E05B 29/004* (2013.01); *E05B 29/0026* (2013.01); *E05B 35/001* (2013.01); *B60R 25/02115* (2013.01); *E05B 77/44* (2013.01)

(58) Field of Classification Search
  CPC ...... E05B 27/0042; E05B 29/00; E05B 9/086; E05B 9/084; E05B 15/1614; E05B 17/2084; E05B 27/0007; E05B 27/0014; E05B 29/0013; E05B 29/0026; E05B 35/001; E05B 19/0029; E05B 19/0023; E05B 29/004; E05B 77/44; B60R 25/04; B60R 25/0211; B60R 25/021; B60R 25/02; B60R 25/02115
  USPC .......................................... 70/186, 416, 252
  See application file for complete search history.

(56) References Cited

U.S. PATENT DOCUMENTS

| | | | | |
|---|---|---|---|---|
| 4,771,619 A * | 9/1988 | Shiramizu | ......... | B60R 25/02128 70/186 |
| 4,972,692 A * | 11/1990 | Morikawa | ......... | B60R 25/02102 70/186 |
| 5,632,167 A * | 5/1997 | Kawachi | ............... | B60R 25/021 70/1.5 |
| 6,003,349 A * | 12/1999 | Nagae | ............... | B60R 25/02115 70/186 |
| 6,382,003 B1 * | 5/2002 | Watanuki | ............... | B60R 25/04 70/184 |
| 6,384,711 B1 * | 5/2002 | Cregger | ............. | G07C 9/00103 340/5.65 |
| 6,389,856 B1 * | 5/2002 | Watanuki | ................ | B60R 25/04 70/184 |
| 6,442,985 B1 * | 9/2002 | Watanuki | ................ | B60R 25/04 70/186 |
| 6,604,392 B1 * | 8/2003 | Kiso | ................ | B60R 25/02126 70/186 |
| 6,931,896 B2 * | 8/2005 | Ochi | ................ | B60R 25/02113 70/182 |
| 6,941,779 B2 * | 9/2005 | Shigeyama | ....... | B60R 25/02126 70/186 |
| 7,299,669 B1 * | 11/2007 | Chung | ............. | B60R 25/02142 70/186 |
| 8,234,895 B2 * | 8/2012 | Nakamoto | ............. | B60R 25/02 70/182 |
| 2002/0092332 A1 * | 7/2002 | Canard | ............. | B60R 25/02131 70/186 |
| 2002/0178769 A1 * | 12/2002 | Okuno | ............. | B60R 25/02126 70/186 |
| 2003/0233857 A1 * | 12/2003 | Chung | ............. | B60R 25/02126 70/186 |
| 2004/0003632 A1 * | 1/2004 | Ohtaki | .................... | B60R 25/04 70/252 |
| 2007/0234768 A1 * | 10/2007 | Yamaguchi | ............. | E05B 17/04 70/379 R |
| 2009/0038351 A1 | 2/2009 | Tamezane et al. | | |
| 2014/0230501 A1 * | 8/2014 | Fenayon | ................ | E05B 77/44 70/344 |
| 2016/0052489 A1 * | 2/2016 | Kiso | ....................... | E05B 27/00 70/237 |

FOREIGN PATENT DOCUMENTS

| | | |
|---|---|---|
| JP | 2006233422 A | 9/2006 |
| JP | 2014-105498 A | 6/2014 |
| JP | 2015-124585 A | 7/2015 |

OTHER PUBLICATIONS

Extended European Search Report for corresponding European Patent Application No. 15202968.2 dated Jun. 7, 2016.

\* cited by examiner

KEY CYLINDER DEVICE

The present application is based on Japanese patent application No.2015-001414 filed on Jan. 7, 2015, the entire contents of which are incorporated herein by reference.

BACKGROUND OF THE INVENTION

1. Field of the Invention

The invention relates to a key cylinder device and, in particular, to a key cylinder device provided with tumblers to be aligned by insertion of a key.

2. Description of the Related Art

A key cylinder device used for, e.g., a vehicle steering lock device is known (see e.g., JP-B-3346706).

The key cylinder device disclosed in JP-B-3346706 is provided with a cylinder lock in which an inner cylinder is inserted into an outer cylinder from the rear side (steering lock device side) so as to be rotatable. The cylinder lock is configured such that a lock pin provided to protrude from the inner surface of the outer cylinder butts against a flange-shaped portion formed on the rear side of the inner cylinder while the flange-shaped portion of the inner cylinder butts against a step portion formed inside a body of the steering lock device, and the inner cylinder is thereby prevented from moving toward the rear side.

In the inner cylinder of the cylinder lock, key checking tumblers movable in a radial direction of the inner cylinder are resiliently held in plural tumbler holding holes providing passages across a key insertion hole which extends in a rotation axis direction.

When the cylinder lock is unlocked, the protruding end portions of the tumblers are withdrawn from recesses on the inner surface of the outer cylinder by insertion of a key into the key insertion hole to allow the inner cylinder to rotate, and the cylinder lock is thereby unlocked. On the other hand, when the cylinder lock is locked, the protruding end portions of the tumblers are advanced into the recesses of the outer cylinder by extraction of the key from the key insertion hole to prevent the inner cylinder from rotating, and the cylinder lock is thereby locked.

SUMMARY OF THE INVENTION

The cylinder lock is configured such that the key and the tumblers are used to mechanically check for key matching, and the positions of the tumblers inside the inner cylinder are related to a key insertion detection function for detecting insertion of the key in the key insertion hole and a lock function for holding the inner cylinder at the locked/unlocked position.

The key insertion detection function and the lock function are realized by the shape of the outer cylinder, and only a difference in key shape causes a need to prepare different components to form an unique cylinder lock. Therefore, the dimensional accuracy of the components needs to be ensured for each cylinder lock having a different shape of outer cylinder to associate with the key insertion detection function and the lock function, causing an increase in the manufacturing cost.

It is an object of the invention to provide a key cylinder device that needs no change in shape of the entire device thereof even when using a key with different shapes.

(1) According to an embodiment of the invention, a key cylinder device comprises:

a rotor resiliently mounting tumblers that are aligned by insertion of a mechanical key;

a rotor case rotatably housing the rotor that is inserted in a direction opposite to an insertion direction of the mechanical key; and a cylindrical sleeve arranged around an outer peripheral surface of the rotor and fixed to an inner surface of the rotor case, wherein the sleeve comprises a hole that allows the tumblers to be disengaged when the mechanical key is inserted and to be engaged when the mechanical key is extracted.

In the above embodiment (1) of the invention, the following modifications and changes can be made.

(i) The rotor comprises a stopper member for preventing the rotor from being pulled out, and wherein the stopper member is resiliently supported on an outer surface of a rear portion of the rotor and comes into contact with a rear end face of the sleeve.

(ii) A front end face of the sleeve comes into contact with an annular stepped portion formed on the inner peripheral surface of the rotor case and located on the rear side of a flange portion of the rotor case.

(iii) The tumblers are aligned in a longitudinal direction of the rotor, and wherein the hole of the sleeve is opened throughout an entire length of the tumbles aligned in the longitudinal direction.

(iv) The tumblers comprise a plurality of tumbler arrays aligned in a longitudinal direction of the rotor, and wherein the hole of the sleeve is formed with respect to each of the plurality of tumbler arrays.

Effect of the Invention

According to an embodiment of the invention, a key cylinder device can be provided that needs no change in shape of the entire device thereof even when using a key with different shapes.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Preferred embodiments of the invention will be specifically described below in conjunction with the appended drawings. In the following description, front means a key insertion hole side of a key cylinder, rear means a rear side of the key insertion hole, and upper, lower, left and right are directions when viewing the key insertion hole from the front.

First Embodiment

General Configuration of Key Cylinder Device

Figure 1:
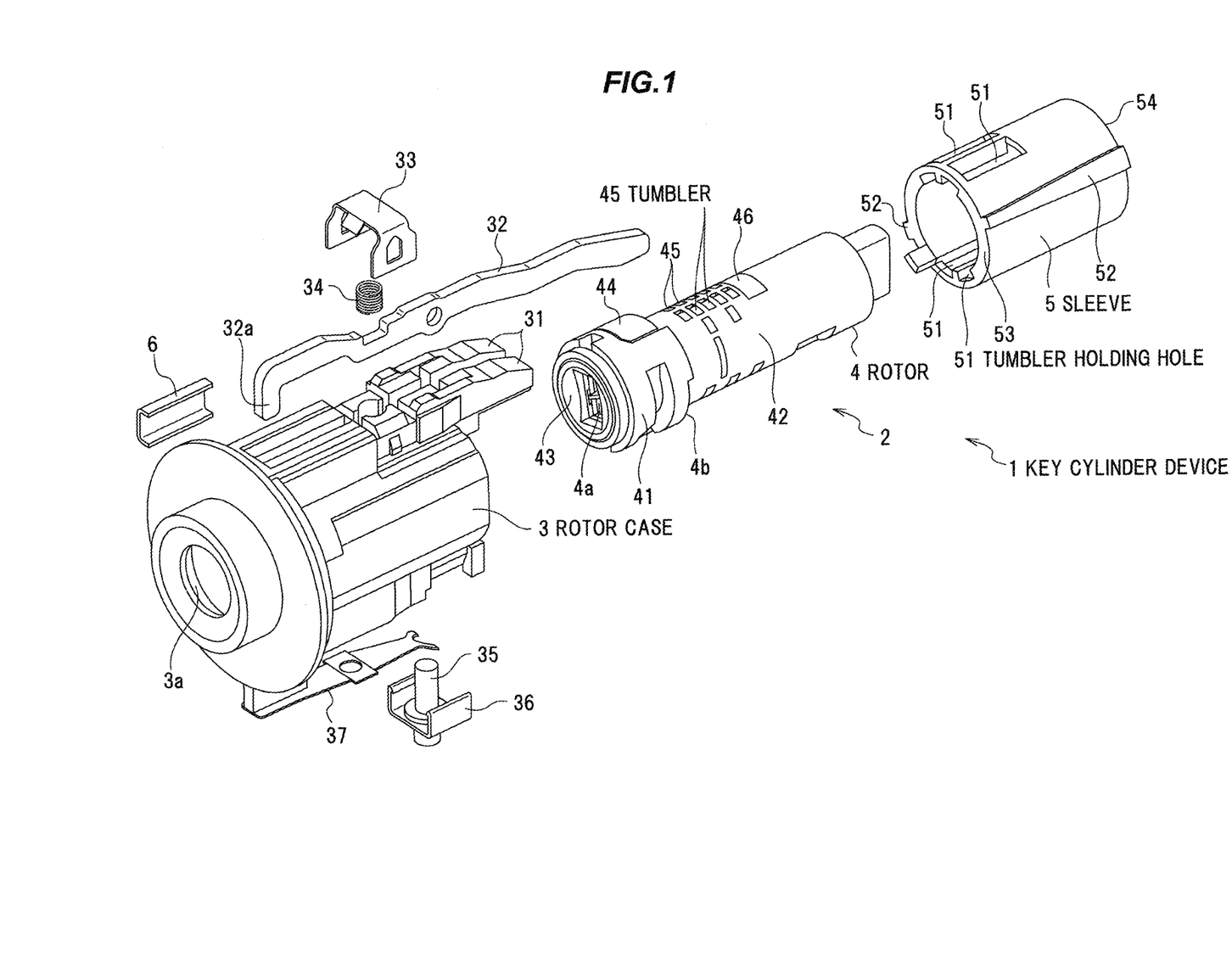
FIG. 1 is an exploded perspective view showing a key cylinder device in a first preferred embodiment of the present invention.

FIG. 1 shows a configuration example of a typical key cylinder device in the first embodiment which is indicated generally by the reference numeral 1. The key cylinder device 1 is provided in a steering lock device which disables a rotating operation of a column shaft (not shown) when a vehicle is parked.

The key cylinder device 1 in the illustrated example is provided with a key cylinder 2 capable of mechanical authentication of a mechanical key (not shown) (hereinafter, referred to as "key"). The key cylinder 2 is provided with a cylindrical rotor case 3 and a columnar rotor 4. The rotor case 3 has an opening at an end on the opposite side to a key insertion hole 4a into which a key is inserted. The rotor 4 is rotatably housed in the rotor case 3. The rotor 4 is assembled to the rotor case 3 in a direction opposite to a key insertion direction and this increases resistance of the rotor 4 against being pulled out from the rotor case 3.

The key cylinder 2 has the key insertion hole 4a formed along a direction of a rotor rotation axis. Rotational operation of the key changes the position of the key cylinder 2 between first to fourth positions which are an LOCK position, an ACC (accessory) position, an ON position and a START position in a clockwise direction as viewing the key insertion hole 4a from the front.

The steering lock device is locked when the key cylinder 2 is located at the LOCK position, and is unlocked when the key cylinder 2 is located at any position from the ACC position to the START position.

The key cylinder 2 is coupled to a camshaft which is a component of the steering lock device to operate an ignition switch (not shown). When the key cylinder 2 is rotationally operated from the LOCK position through the ACC position to the ON position or the START position, connection of the contact point of the ignition switch is switched via the camshaft. Based on the connection state of the ignition switch changed by the switching operation, the status of various on-vehicle devices and an engine is switched.

Configuration of Rotor Case

Figure 2:
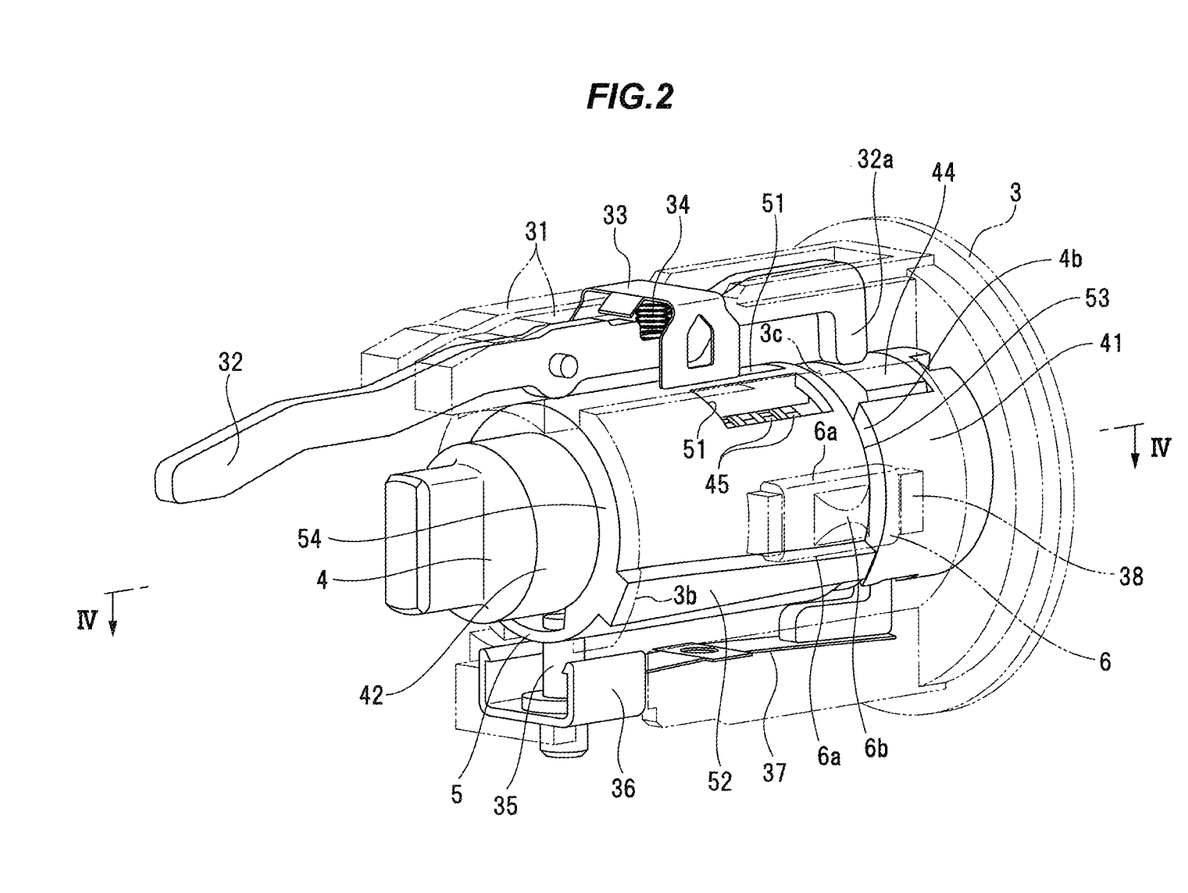
FIG. 2 is a partial perspective view showing the inside of the key cylinder device in the first embodiment.
Figure 3A:
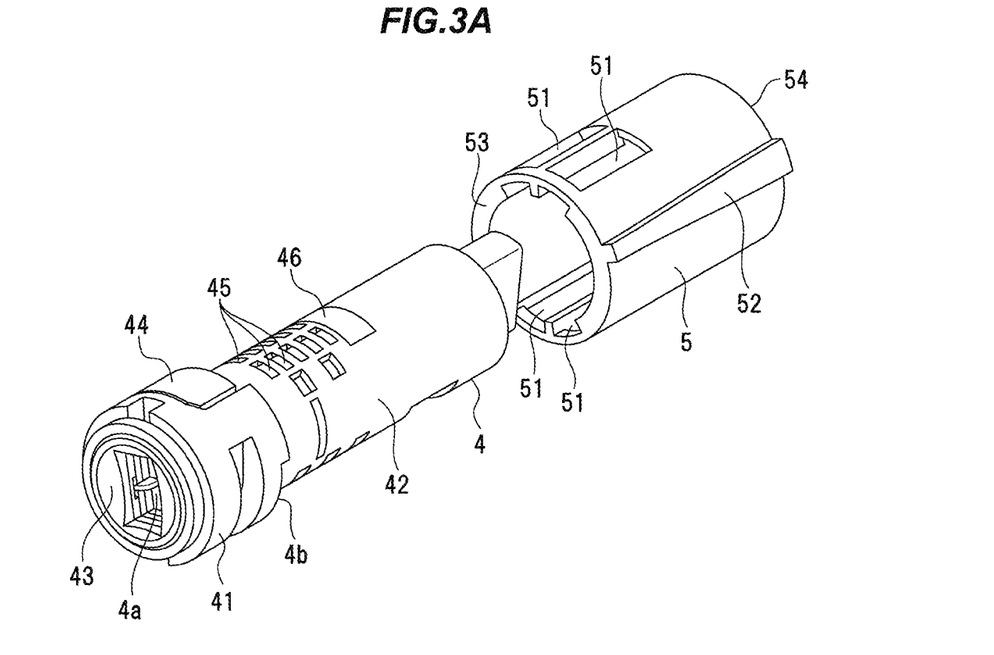
FIGS. 3A and 3B are exploded perspective views showing the main section of the key cylinder device in the first embodiment during an assembly process thereof.
Figure 3B:
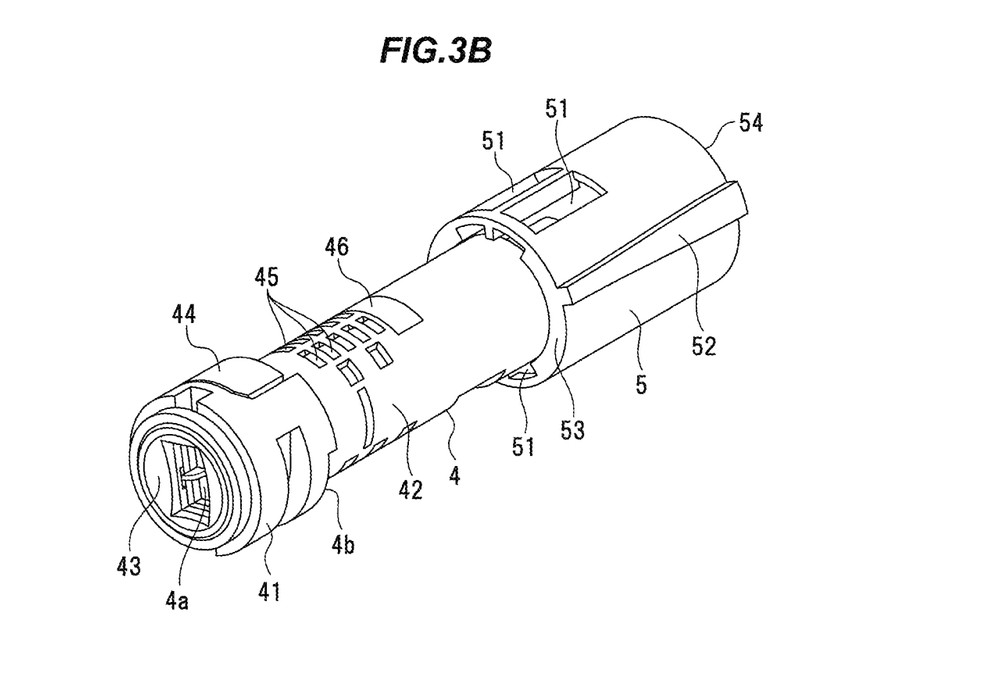

As shown in FIGS. 1 and 2, the rotor case 3 is formed of a cylindrical member with a circular flange-shaped case and has a key operation hole 3a on a flange portion. A constituent material of the rotor case 3 is, e.g., a metal material such as die-cast zinc.

Two support walls 31 defining a recess therebetween along a key insertion direction are formed on an upper peripheral portion of the rotor case 3, and a locking lever 32 is pivotally supported between the support walls 31. The locking lever 32 has, e.g., a key insertion detection function for detecting insertion of a key and a lock function for holding a locking member such as locking bar or lock stopper which enables or disables a rotating operation of the column shaft.

To the locking lever 32, a coil spring 34 is attached in a state of being covered with a cover plate 33 having a pair of leg portions fixed to the rotor case 3. The locking lever 32 is pressed toward the rotor 4 by a spring force of the coil spring 34.

A stopper pin 35 used to attach the key cylinder 2 to a lock body (not shown) penetrates the lower peripheral portion of the rotor case 3 so as to be movable in a radial direction of the rotor. The stopper pin 35 is attached to a stopper cover 36 having a pair of leg portions fixed to the rotor case 3 and is pressed toward the lock body by an elastic force of a lever 37 fixed at one end to the rotor case 3.

The rotor case 3 is housed and fixed via a wobble-inhibiting nibber packing 6 inside the lock body which is formed of a metal material such as die-cast zinc.

A packing holder 38 is formed to protrude from a lock body-facing surface of the rotor case 3. Meanwhile, the rubber packing 6 is composed of a pair of attachment piece portions 6a and a packing portion 6b coupling edges of the attachment piece portions 6a, and is fitted and fixed to the packing holder 38.

Configuration of Rotor

As shown in FIGS. 1 to 3B, the rotor 4 has a shape with a step such that a large diameter rotor portion 41 having a key insertion detection function and a small diameter rotor portion 42 having a key checking function for checking a mechanical match of a key are integrally coupled with a level difference portion therebetween.

A front cover 43 having a key insertion slot is housed in and fixed to a front opening of the large diameter rotor portion 41. A sliding piece 44 is housed in the peripheral portion of the large diameter rotor portion 41 so as to be movable in a radial direction of the rotor when inserting/extracting the key. A bent piece 32a formed by bending a front end of the locking lever 32 is arranged to face the outer surface of the sliding piece 44.

Meanwhile, plural tumblers 45 having a plate shape elongated in a radial direction and a locking piece 46 for preventing rotation of the camshaft are housed inside the small diameter rotor portion 42 so as to be resiliently retractable. A tumbler hole (not shown) to be engaged with a groove of the key is formed on each tumbler 45. The tumblers 45, when engaged with the key grooves through the tumbler holes, are thereby elastically held inside the small diameter rotor portion 42 at a predetermined position to be a key checking position for checking a mechanical match of the key.

In the state that the key is not inserted into the small diameter rotor portion 42, protruding end portions of the tumblers 45 protrude beyond the outer peripheral surface of the small diameter rotor portion 42 and rotation of the rotor 4 is restricted by engagement of the protruding end portions with the inner peripheral surface of the rotor case 3.

In the state that the key is inserted into the key insertion hole 4a, the tumblers 45 engaged with the grooves of the key all retract inward beyond the outer peripheral surface of the rotor 4. As a result, the rotor 4 can be rotationally operated without contact of any tumblers 45 with the inner peripheral surface of the rotor case 3.

Compatible Configuration of Rotor Case

The shape and number of the tumblers 45 are different depending on the shape of key, and the rotor 4 needs to be changed according to the shape and number of the tumblers 45. Then, changing the rotor 4 involves change of the shape of the rotor case 3 since the key insertion detection function and the lock function of the locking lever 32 are realized by the shape of the rotor case 3.

Based on this, a cylindrical metal sleeve 5 is used in the first embodiment to allow the rotor case 3 to have compatibility even when the rotor 4 is changed to match a different shape of key. The position of the sleeve 5 to restrict rotation of the rotor 4 is set to correspond to a changed key shape.

Two tumbler holding holes 51 having a long shape elongated in the direction of the rotor rotation axis and arranged side by side are formed on each of two opposing sides of the sleeve 5 so as to penetrate the peripheral portion of the sleeve 5. The tumbler holding holes 51 serve to allow the protruding end portions of the tumblers to be disengaged when the key is inserted, and to be engaged when the key is extracted.

The sleeve 5 is formed to have a size (outer diameter) and a thickness which match the shape of a key to be used and the type and number, etc., of the tumblers 45, and the suitable number of the tumbler holding holes 51 having a suitable size and arranged at suitable positions are selected and used according to the shape of the key to be used and the type and number, etc., of the tumblers 45. It is therefore obvious that the positions and number, etc., of the tumbler holding holes 51 are not limited to those in the illustrated example.

The rotor 4 is inserted into the sleeve 5 which is thus placed around the outer peripheral surface of the small diameter rotor portion 42 as shown in FIGS. 1 to 4, and the key cylinder 2 has a multiple cylindrical wall structure composed of the rotor case 3, the rotor 4 and the sleeve 5. Guide ribs 52 extending and tapering in the insertion direction are formed to protrude from the outer peripheral surface of the sleeve 5 at two opposing positions and are inserted into and fixed to guide recesses 3b formed on the inner peripheral surface of the rotor case 3.

Figure 4:
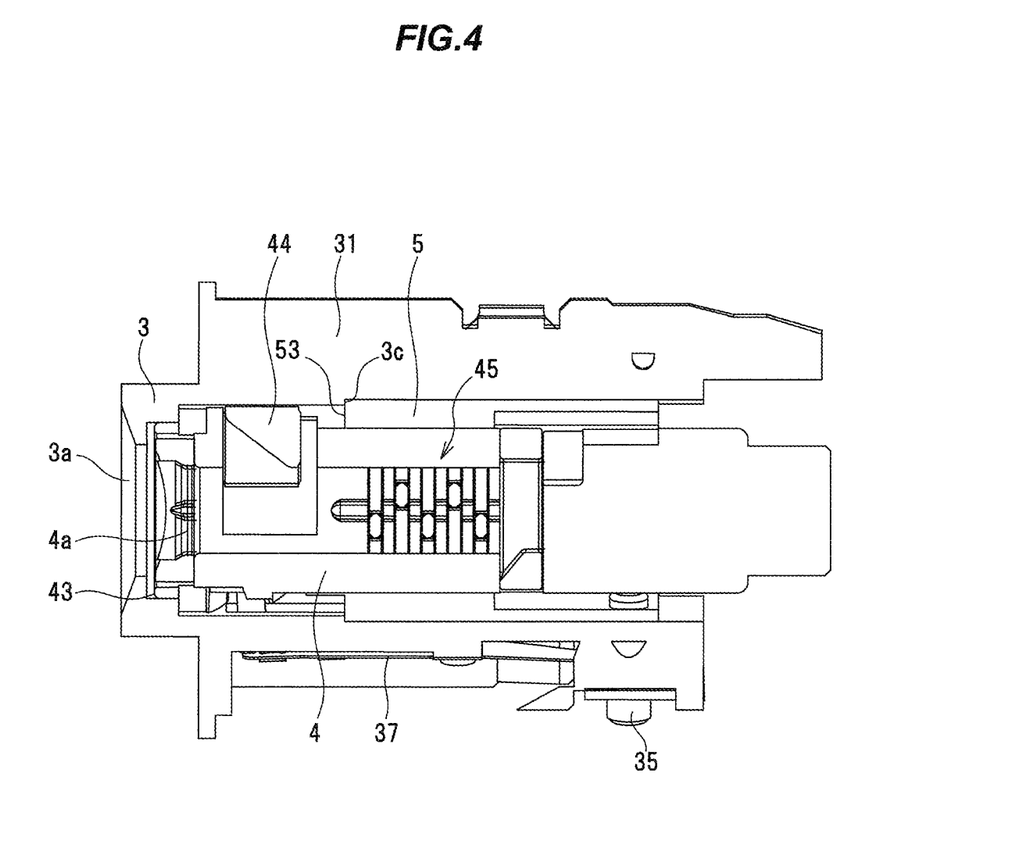
FIG. 4 is a cross sectional view taken along a line IV-IV of FIG. 2 and viewed in a direction of an arrow.
Figure 5:
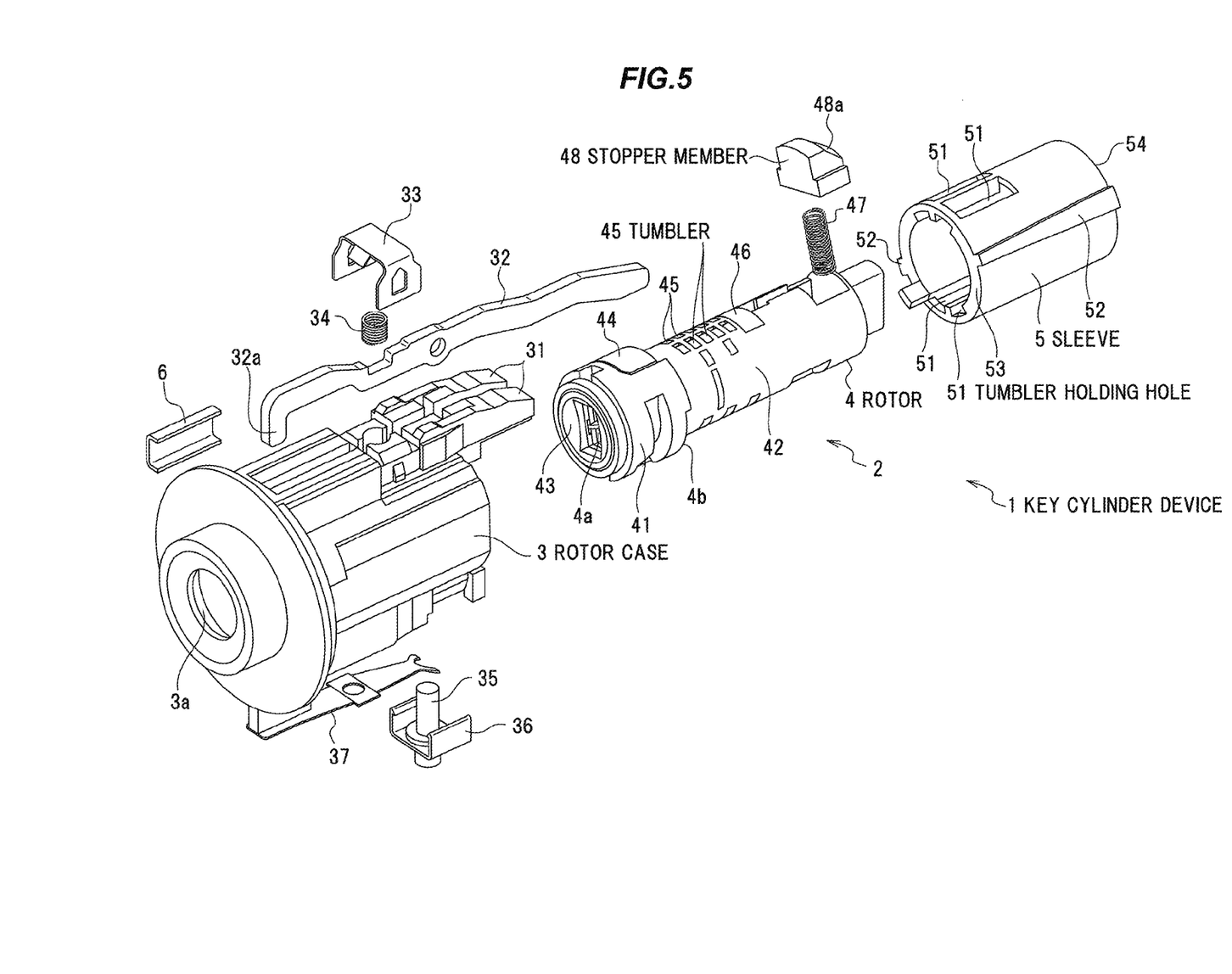
FIG. 5 is an exploded perspective view showing a key cylinder device in a second embodiment.
Figure 6:
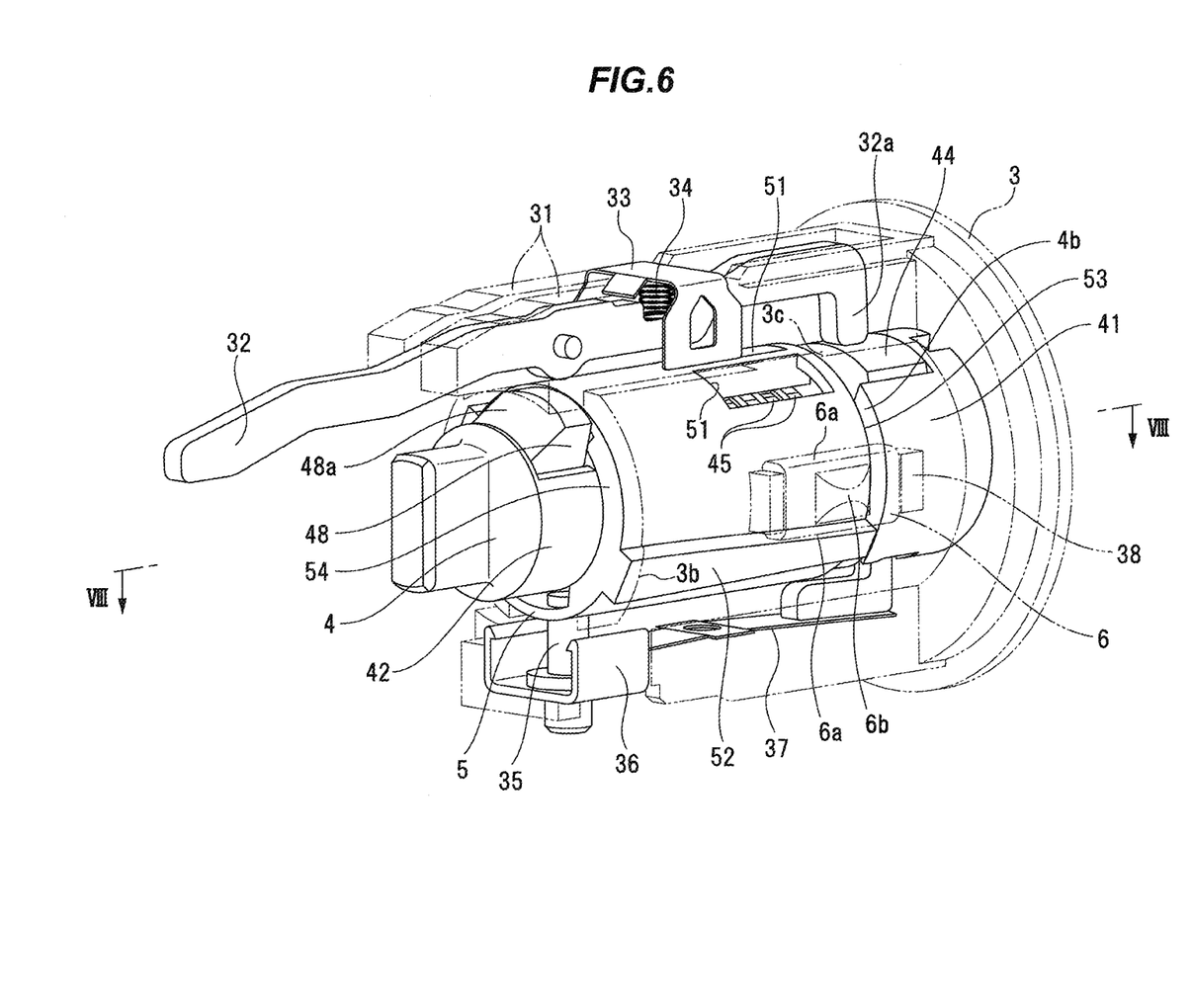
FIG. 6 is a partial perspective view showing the inside of the key cylinder device in the second embodiment.
Figure 7A:
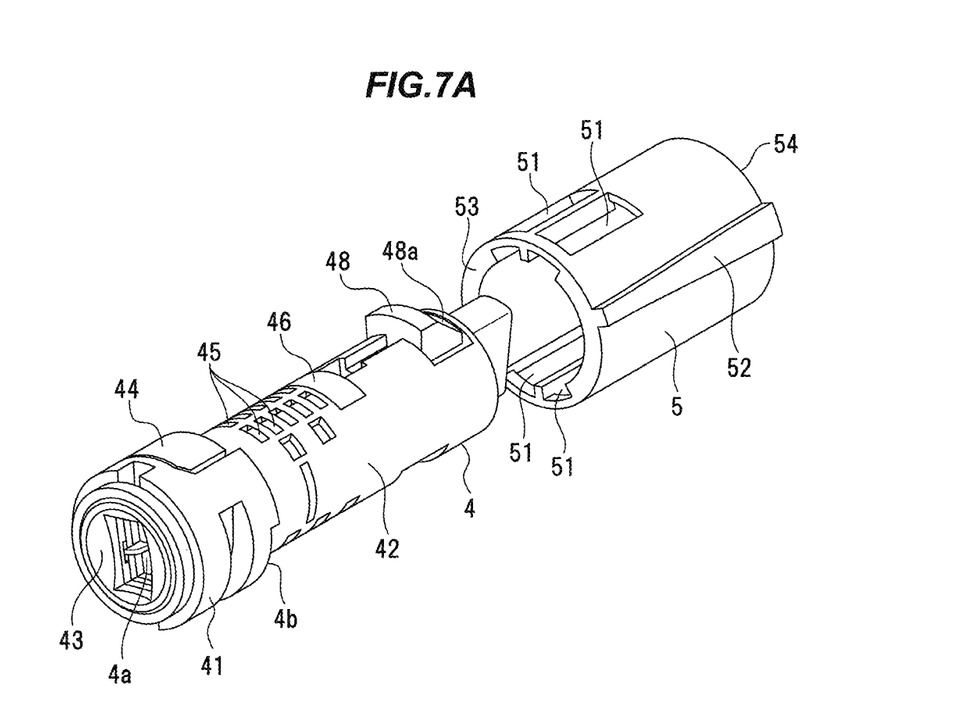
FIGS. 7A and 7B are exploded perspective views showing the main section of the key cylinder device in the second embodiment during an assembly process thereof.
Figure 7B:
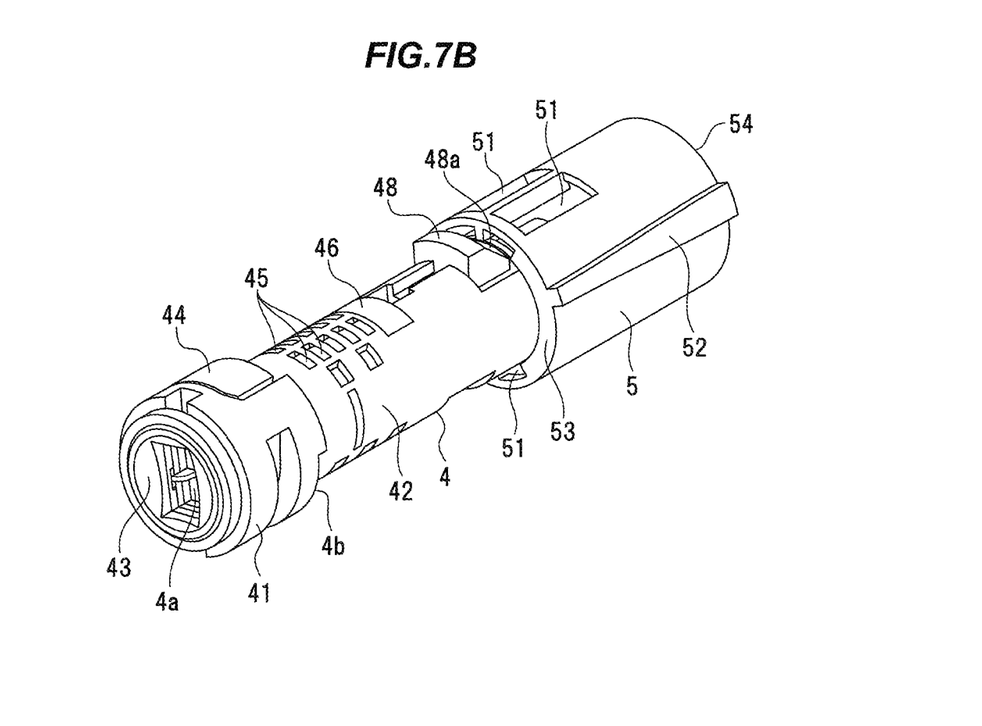

An opening end face 53 located on the front side of the sleeve 5 is configured as a stopping surface which comes into contact with an annular step surface 4b formed between the large diameter rotor portion 41 and the small diameter rotor portion 42 and also with an annular stepped portion 3c formed on the inner peripheral surface of the rotor case 3 and located behind the flange portion, and thereby prevents the rotor 4 from being pulled out. Meanwhile, a rear end portion of the sleeve 5 is configured as a stopping portion to which the stopper pin 35 penetrating the lower peripheral portion of the rotor case 3 is fitted and fixed and which thereby prevents the pull-out.

A decrease in attack resistance of the rotor 4 against being pulled out is prevented by the opening end face 53 of the sleeve 5, the annular stepped portion 3c of the rotor case 3, the step surface 4b of the rotor 4 and the stopper pin 35.

Effects of the First Embodiment

The key cylinder device 1 configured as described above exerts the following effects, in addition to the effects described above.

(1) It is acceptable to reduce the accuracy level of components having the key insertion detection function and the lock function in case that the shape of a key to be used and the type and number, etc., of the tumblers 45 are changed, and it is thus possible to suppress the cost increase.

(2) Even when the rotor 4 is changed to match a different key shape, it is possible to reduce the types of components since the sleeve 5 has a function of allowing the rotor case 3 to have compatibility.

(3) Since it is possible to reduce the types of components, it is possible to reduce frequency of changing setup for component assembly and thus possible to reduce man-hours to assemble the components.

Second Embodiment

FIGS. 5 to 8 show a configuration example of the key cylinder device 1 in the second embodiment. Members which are substantially the same as those in the first embodiment are denoted by the same names and reference numerals in FIGS. 5 to 8 and the detailed explanation for such members will be omitted.

In the first embodiment, the rotor case 3 is formed of a metal material such as die-cast zinc. The second embodiment is different from the first embodiment in that the rotor case 3 is formed of a resin material and also attack resistance of the rotor 4 against being pulled out is further increased.

The rotor case 3 shown in FIGS. 5 to 8 is formed of a cylindrical member with a circular flange-shaped case and is made of a resin material, e.g., polybutylene terephthalate (PBT) mixed with glass fibers.

A rectangular bottle cap-shaped stopper member 48 is arranged on the rear peripheral portion of the small diameter rotor portion 42 via a coil spring 47. The stopper member 48 is pressed outward in a radial direction of the rotor by a spring force of the coil spring 47 and prevents the rotor 4 from being pulled out from the front of the rotor case 3. A decrease in attack resistance of the rotor 4 against being pulled out is further prevented by the stopper member 48.

An inclined surface 48a inclined downward is formed on a rear end of the stopper member 48. When the sleeve 5 is pushed in against the spring force of the coil spring 47 so as to cover the outer peripheral surface of the rotor 4 in a state that the inclined surface 48a faces toward an opening end face 54 located on the rear end side of the sleeve 5, the stopper member 48 receives a downward component of force on the inclined surface 48a and travels inside the cylinder of the sleeve 5 while sinking down.

Once the sleeve 5 passes over the inclined surface 48a of the stopper member 48, the opening end face 54 located on the rear end side of the sleeve 5 comes into contact with a front end face of the stopper member 48 while the opening end face 53 located on the front end side of the sleeve 5 comes into contact with the step surface 4b of the rotor 4, and the stopper member 48 returns to the original position due to a restoring force of the coil spring 47. This restricts the rotor 4 from separating from the sleeve 5.

Figure 8:
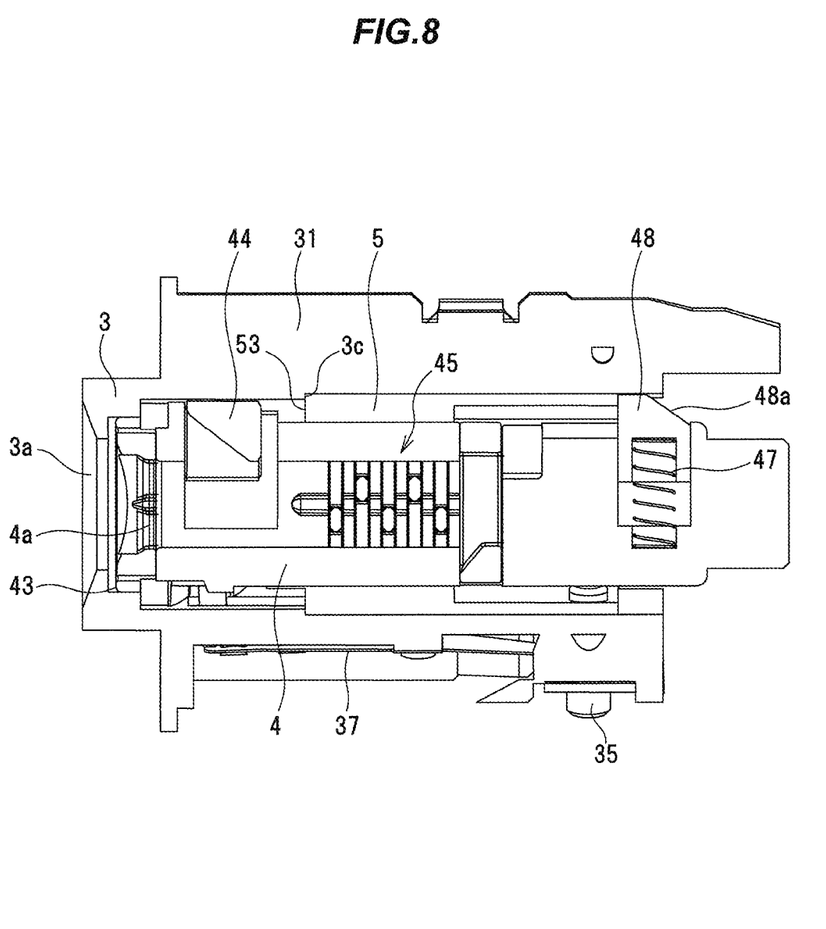
FIG. 8 is a cross sectional view taken along a line VIII-VIII of FIG. 6 and viewed in a direction of an arrow.

The opening end face 53 located on the front side of the sleeve 5 is configured as a stopping surface which comes into contact with the step surface 4b of the rotor 4 as well as with stepped portion 3c of the rotor case 3 and thereby prevents the rotor 4 from being pulled out, and in addition, the opening end face 54 located on the rear end side of the sleeve 5 is configured as a stopping surface which comes into contact with the front end face of the stopper member 48 and thereby prevents the rotor 4 from being pulled out. The stopper member 48 prevents a decrease in attack resistance of the rotor 4 against being pulled out and a decrease in attack resistance caused by using the resin rotor case 3. Thus, attack resistance is improved such that the rotor 4 cannot be pulled out even when the flange portion of the rotor case 3 is broken.

Effects of the Second Embodiment

In addition to the effects of the first embodiment, the key cylinder device 1 in the second embodiment does not require secondary processing since the rotor case 3 is formed of a resin material, and it is thus possible to reduce the manufacturing cost and also to reduce the weight of the key cylinder 2.

In addition, although the key cylinder device 1 is applied to a car in the typical configuration example of the invention, it is not limited thereto. It is obvious that the invention can be effectively applied to, e.g., various vehicles such as construction machineries and agricultural machineries.

It is obvious from the above description that the invention according to claims is not to be limited to the typical embodiments and illustrated examples of the invention. Therefore, it should be noted that all combinations of the features described in the embodiments and illustrated examples are not necessary to solve the problem of the invention.

What is claimed is:

1. A key cylinder device, comprising:
a rotor resiliently mounting tumblers that are aligned by insertion of a mechanical key;
a rotor case rotatably housing the rotor that is inserted in a direction opposite to an insertion direction of the mechanical key; and
a cylindrical sleeve arranged around an outer peripheral surface of the rotor and non-rotatably fixed to an inner surface of the rotor case, wherein outer side surfaces of the cylindrical sleeve directly contact inner side surfaces of the rotor case,
wherein the sleeve comprises a hole that allows the tumblers to be disengaged when the mechanical key is inserted and to be engaged when the mechanical key is extracted, and
wherein the rotor case is configured to be non-rotatably and directly fixed to a lock body of a vehicle such that the rotor is rotatable relative both to the rotor case and the cylindrical sleeve.

2. The key cylinder device according to claim 1, wherein a front end face of the sleeve comes into contact with an annular stepped portion formed on the inner peripheral surface of the rotor case and located on the rear side of a flange portion of the rotor case.

3. The key cylinder device according to claim 1, wherein the tumblers are aligned in a longitudinal direction of the rotor, and
wherein the hole of the sleeve is opened throughout an entire length of the tumblers aligned in the longitudinal direction.

4. The key cylinder device according to claim 1, wherein the tumblers comprise a plurality of tumbler arrays aligned in a longitudinal direction of the rotor, and
wherein the hole of the sleeve is formed with respect to each of the plurality of tumbler arrays.

5. The key cylinder device according to claim 1,
wherein the rotor comprises a stopper member for preventing the rotor from being pulled out, and
wherein the stopper member is resiliently supported on an outer surface of a rear portion of the rotor and comes into contact with a rear end face of the sleeve.

6. The key cylinder device according to claim 5,
wherein the stopper member comprises an inclined surface on the contact side with the sleeve.

7. The key cylinder device according to claim 1, wherein outer side surfaces of the cylindrical sleeve directly contact inner side surfaces of the rotor case substantially throughout a length of the cylindrical sleeve.

* * * * *